United States Patent
Jax et al.

(10) Patent No.: US 9,355,644 B2
(45) Date of Patent: May 31, 2016

(54) METHOD AND APPARATUS FOR SEARCHING IN A LAYERED HIERARCHICAL BIT STREAM FOLLOWED BY REPLAY, SAID BIT STREAM INCLUDING A BASE LAYER AND AT LEAST ONE ENHANCEMENT LAYER

(75) Inventors: Peter Jax, Hannover (DE); Sven Kordon, Wunstorf (DE)

(73) Assignee: Thomson Licensing (FR)

( * ) Notice: Subject to any disclaimer, the term of this patent is extended or adjusted under 35 U.S.C. 154(b) by 164 days.

(21) Appl. No.: 13/703,417

(22) PCT Filed: Jun. 1, 2011

(86) PCT No.: PCT/EP2011/059040
§ 371 (c)(1),
(2), (4) Date: Dec. 11, 2012

(87) PCT Pub. No.: WO2011/154297
PCT Pub. Date: Dec. 15, 2011

(65) Prior Publication Data
US 2013/0096929 A1 Apr. 18, 2013

(30) Foreign Application Priority Data
Jun. 11, 2010 (EP) .................................... 10305628

(51) Int. Cl.
*G10L 19/18* (2013.01)
*G10L 19/00* (2013.01)
(Continued)

(52) U.S. Cl.
CPC ............. *G10L 19/0017* (2013.01); *G10L 19/24* (2013.01); *H04N 19/44* (2014.11); *H04N 21/4398* (2013.01); *H04N 21/4621* (2013.01); *G10L 19/167* (2013.01)

(58) Field of Classification Search
CPC ...................................................... G10L 19/18
USPC .................................................. 704/500–504
See application file for complete search history.

(56) References Cited

U.S. PATENT DOCUMENTS

| 6,498,811 | B1 | 12/2002 | Van Der Vleuten | |
|---|---|---|---|---|
| 7,782,808 | B2 * | 8/2010 | Suh et al. | 370/312 |

(Continued)

FOREIGN PATENT DOCUMENTS

| CN | 101490746 | 7/2009 |
|---|---|---|
| EP | 0756386 B1 | 1/1997 |

(Continued)

OTHER PUBLICATIONS

Schwarz et al: "Overview of the Scalable Video Coding Extension of the H.264/AVC Standare", IEEE Transactions on Circuits and Systems for Video Technology, vol. 17, No. 9, Sep. 1, 2007, pp. 1103-1120.

(Continued)

*Primary Examiner* — Michael N Opsasnick
(74) *Attorney, Agent, or Firm* — Jack Schwartz & Associates, PLLC

(57) ABSTRACT

A two-layer hierarchical audio bit stream can have a frame-based structure for the base layer bit stream and can be decoded independently from a higher layer and the decoding can start following every sync header. In the extension layer bit stream the frame structure may not be reflected on bit stream level. To facilitate seek operations with such highly compressed extension-layer data, the header of the extension layer bit stream comprises an FAT table with seek target positions. Because there are fewer entry points in the enhancement layer than sync headers in the base layer, a re-synchronization and some base layer frames are required to start decoding of the enhancement layer and to generate the full audio quality. Three seeking ways of seeking are described, of which each one offers a different compromise between seeking accuracy, re-synchronization latency and audio quality.

2 Claims, 3 Drawing Sheets

Figure 1:
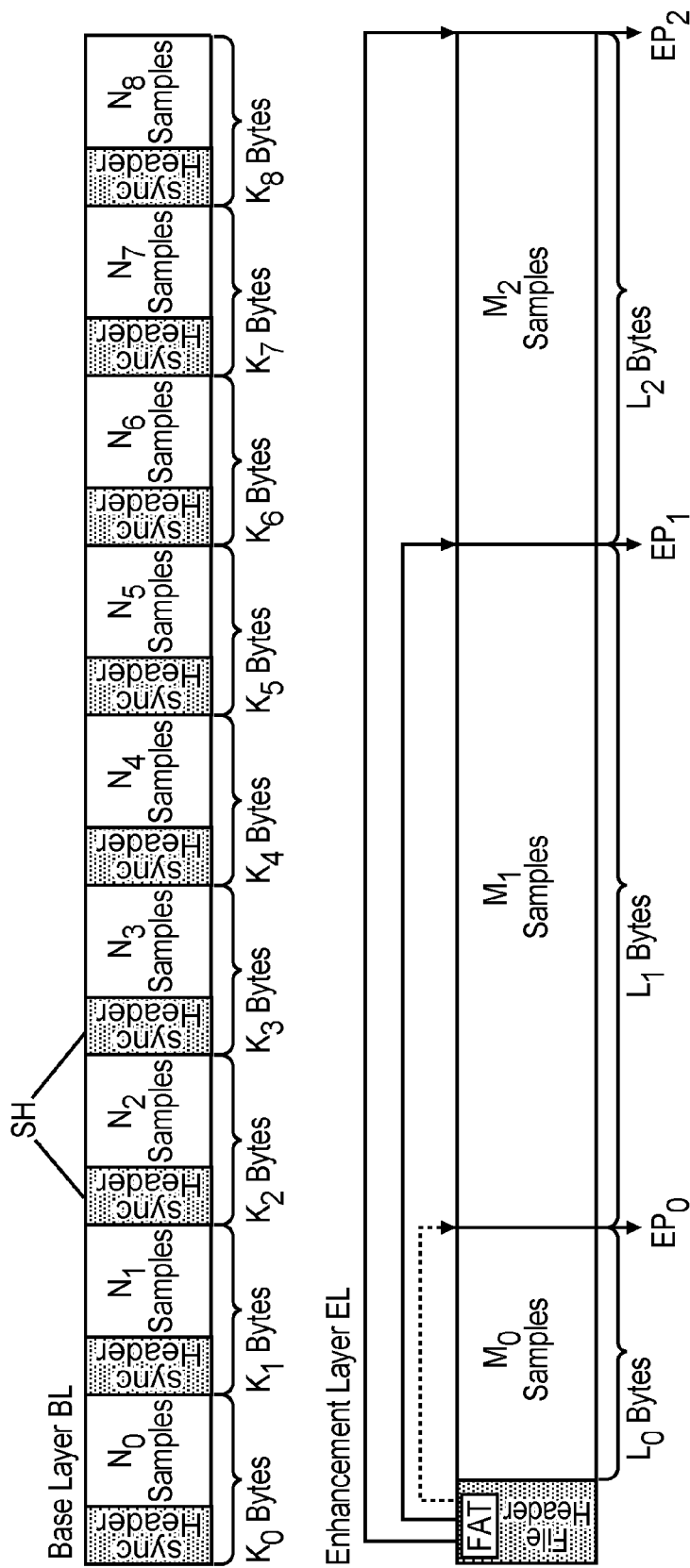

(51) Int. Cl.
*G10L 19/24* (2013.01)
*H04N 21/439* (2011.01)
*H04N 21/462* (2011.01)
*H04N 19/44* (2014.01)
*G10L 19/16* (2013.01)

(56) References Cited

U.S. PATENT DOCUMENTS

| | | | | |
|---|---|---|---|---|
| 7,826,537 | B2* | 11/2010 | Zhang et al. | 375/240.27 |
| 8,306,827 | B2* | 11/2012 | Yamanashi et al. | 704/500 |
| 8,462,702 | B2* | 6/2013 | Jax et al. | 370/328 |
| 2005/0050430 | A1* | 3/2005 | Furuya | 714/758 |
| 2007/0074266 | A1* | 3/2007 | Raveendran et al. | 725/135 |
| 2007/0081586 | A1* | 4/2007 | Raveendran et al. | 375/240.1 |
| 2007/0081587 | A1* | 4/2007 | Raveendran et al. | 375/240.1 |
| 2007/0086521 | A1* | 4/2007 | Wang et al. | 375/240.1 |
| 2009/0240506 | A1 | 9/2009 | Wuebbolt et al. | |
| 2011/0158326 | A1 | 6/2011 | Kordon et al. | |

FOREIGN PATENT DOCUMENTS

| | | |
|---|---|---|
| EP | 2146343 | 1/2011 |
| WO | WO2010014123 | 2/2010 |

OTHER PUBLICATIONS

Garzella: "Two-layer hierarchical coding far MPEG-2 video", Electronics Letter, IEE Stevenage, vol. 36, No. 20, Sep. 28, 2000. pp. 1696-1697.
Cuenca et al: "Packing scheme for layered coding MPEG-2 video transmission over ATM based networks", IEEE ATM Workshop 1957, May 25, 1997, pp. 168-177.
Search Report Dated Jul. 28, 2011.
Makhoul, "Linear Prediction:A Tutorial Review", Proceedings of the IEEE, vol. 63, No. 4, Apr. 1975, pp. 561-580.
Painter et al., "Perceptual Coding of Digital Audio", Proceedings of the IEEE, vol. 88, No. 4, Apr. 2000, pp. 451-513.
Hans et al., "Lossless compression of digital audio", IEEE Signal Processing Magazine, Jul. 2001, pp. 21-32.
Craven et al., "Lossless Coding for Audio Discs", J. Audio Eng. Soc., vol. 44, No. 9, Sep. 1996, pp. 706-720.
Koller et al., "Robust Coding of High Quality Audio Sinals", AES 103rd Convention, Preprint 4621, Aug. 1997, pp. 1-20.
ISO/IEC 11172-3 International Statndard, "Information Technology-Coding of moving pictures and associated audio for digital storage media at up to about 1,5 Mbit/s", Part 3: Audio, First Edition, Aug. 1, 1993, pp. 1-158.
Anonymous "id3.org-Homepage", http://web.archive.org/web/20100516140449/http://www.id3.org/, accessed May 16, 2010, p. 1.

* cited by examiner

METHOD AND APPARATUS FOR SEARCHING IN A LAYERED HIERARCHICAL BIT STREAM FOLLOWED BY REPLAY, SAID BIT STREAM INCLUDING A BASE LAYER AND AT LEAST ONE ENHANCEMENT LAYER

This application claims the benefit, under 35 U.S.C. §365 of International Application PCT/EP2011/059040, filed Jun. 1, 2011, which was published in accordance with PCT Article 21(2) on Dec. 15, 2011 in English and which claims the benefit of European patent application No. 18305628.9, filed Jun. 11, 2010.

The invention relates to a method and to an apparatus for searching in a layered hierarchical bit stream followed by replay, said bit stream including a base layer and at least one enhancement layer which has less entry points than the base layer.

BACKGROUND

In contrast to lossy audio coding techniques (like mp3, AAC etc.), lossless compression algorithms can only exploit redundancies of the original audio signal to reduce the data rate. It is not possible to rely on irrelevancies, as identified by psycho-acoustical models in state-of-the-art lossy audio codecs. Accordingly, the common technical principle of all lossless audio coding schemes is to apply a filter or transform for de-correlation (e.g. a prediction filter or a frequency transform), and then to encode the transformed signal in a lossless manner. The encoded bit stream comprises the parameters of the transform or filter, and the lossless representation of the transformed signal.

See, for example, J. Makhoul, "Linear prediction: A tutorial review", Proceedings of the IEEE, Vol. 63, pp. 561-580, 1975, T. Painter, A. Spanias, "Perceptual coding of digital audio", Proceedings of the IEEE, Vol. 88, No. 4, pp. 451-513, 2000, and M. Hans, R. W. Schafer, "Lossless compression of digital audio", IEEE Signal Processing Magazine, July 2001, pp. 21-32.

The basic principle of lossy based lossless coding is as follows: In the encoding section a PCM audio input signal $S_{PCM}$ passes through a lossy encoder to a lossy decoder and as a lossy bit stream to a lossy decoder of the decoding section, whereby lossy encoding and decoding is used to decorrelate the signal. The output signal of the encoding section lossy decoder is removed from the input signal $S_{PCM}$, and the resulting difference signal passes through a lossless encoder as an extension bit stream to a decoding section lossless decoder. The output signals of the decoding section lossy decoder and lossless decoder are combined so as to regain the original signal $S_{PCM}$.

This basic principle is disclosed in EP-B-0756386 and U.S. Pat. No. 6,498,811, and is also discussed in P. Craven, M. Gerzon, "Lossless Coding for Audio Discs", J. Audio Eng. Soc., Vol. 44, No. 9, September 1996, and in J. Koller, Th. Sporer, K. H. Brandenburg, "Robust Coding of High Quality Audio Signals", AES 103rd Convention, Preprint 4621, August 1997. In more detail, in the lossy encoder the PCM audio input signal $S_{PCM}$ passes through an analysis filter bank and a quantisation of sub-band samples to a coding and bit stream packing, wherein the quantisation is controlled by a perceptual model calculator that receives signal $S_{PCM}$ and corresponding information from the analysis filter bank.

At decoder side, the encoded lossy bit stream enters is depacked, and the lossy decoder decodes the subband samples and a synthesis filter bank outputs the decoded lossy PCM signal.

Examples for lossy encoding and decoding are described in detail in the standard ISO/IEC 11172-3 (MPEG-1 Audio).

The two or more different signals or bit streams resulting from the encoding are to be combined so as to form a single output signal. Similar solutions exist for example for MPEG Surround, mp3PRO and AAC+. For the two latter examples the additional amount of data (SBR information) to be added to the base layer data stream (AAC or mp3) is small. Therefore this additional information can be packed into a standard-conform AAC or mp3 bit stream e.g. as 'ancillary data'. Although the additional amount of data for the surround information is bigger than that for the SBR information, these data can still be packed into a standard-conform bit stream in the same way.

Another application using similar techniques is the ID3 tag added to mp3 standard audio streams, as described in http://www.id3.org. The data is added at the beginning or end of the existing mp3 file. A special mechanism is used so that an mp3 decoder does not try to decode this additional information.

However, for lossy based lossless coding the additional amount of information exceeds the amount of data for the base layer by a multiple of the base layer data amount. Therefore the additional data cannot be packed completely into the base layer data stream e.g. as ancillary data. The at least two data streams resulting from the combination of lossy coding format with a lossless coding extension are the base layer containing the lossy coding information (e.g. a standard coding algorithm) and the enhancement data stream for rebuilding the mathematically lossless original input signal. Furthermore several intermediate layers are possible, each with an own data stream. However, these data streams are not independent. Every higher layer depends on the lower layers and can only be reasonably decoded in combination with these lower layers.

More generic, data formats use hierarchical layers, with a base layer BL and one or more enhancement layers EL. Data within a layer are often packetised, i.e. organised in packets or frames. While the BL signal alone can be decoded to obtain reproducible multimedia data and comprises all information for a basic decoding, the EL signal comprises additional information that cannot be decoded alone to obtain useful multimedia data. Instead, the EL data are tightly coupled to the BL data and can be used only together with the BL data. Usually the BL and EL data are added or superposed to each other, either for a common decoding or after their individual decoding. In either case it is necessary to synchronise the EL data to the BL data because otherwise the EL data will not represent useful information.

It is desirable to keep the data rate as low as possible, requiring sophisticated data compression methods. Variable length coding VLC is used for coding data words the value histogram of which is not equally distributed. Data words that appear more frequently, i.e. with higher probability, are encoded into shorter code words, while data words that appear with lower probability are encoded into longer code words. Thus, the average amount of bits in encoded messages is shorter than using constant code word length. However, high-compression processing using e.g. VLC is more sensitive to bit errors, which may lead to a complete data loss. In particular for VLC, following loss of synchronisation it is impossible to determine which one of the bits are belonging to a code word.

A known solution for limiting possible data loss is the insertion of unique synchronisation words that can be recognised with very high probability. However, such synchronisation words will increase the data rate, and the more synchronisation words are used the higher is the data rate.

Another challenge is to search for or seek—as fast as possible—a specific point of time within a running or stored audio program, i.e. to jump directly to a specific frame or sample in a track.

In the following description 'seeking' means searching in an audio bit stream. Therefore, seeking is a part of the audio decoder that enables a user to skip to a desired position within the encoded signal. Seeking positions are given by a number of samples to skip, the playback time or in percent of the total duration of a track.

The seeking processing strongly depends on the organisation of the audio format. Most of the established audio formats like MPEG-1 Layer III or AAC are streaming formats, which formats are organised in independent frames. Therefore, the decoder can start decoding from each frame without knowledge from a previous frame. For such streaming formats the following two seeking methods can be used.

The first seeking method is based on the condition that each frame has the same length and carries the same number of encoded samples. Then, the seeking position in percent of the total playback time is equivalent to the position in percent of the total bit stream (file) size. Therefore the decoder transforms a desired seeking position into a seeking position in percent of the total playback time, followed by starting decoding at the same percentage of the total bit stream length. However, the decoder needs to perform a resynchronisation to a bit stream frame located at the seeking position.

A more robust seeking processing in frame-based bit streams is to parse frame-by-frame from the beginning of the stream to the desired position. The number of encoded samples per frame and the length of the frame have to be known, but the frame size and the number of encoded samples per frame can be different for each frame. A drawback of such seeking processing is that the seeking latency depends on the seeking position. The more close the desired seeking position is to the end of the bit stream the more frames need to be parsed. On limited processing power architectures the required processing time can cause additional latencies or peaks in the processing load.

In file based formats the size of each frame is unknown and the above-described streaming format frame headers are neglected. The decoder can start decoding from the beginning of the file only. Frame Access Tables (FAT), or a cue point table data block representing a frame access table, are used to define designated entry points for seeking within the bit stream. These tables can contain one or more of e.g. block length, interval info in frames, number of table entries, pointer table. The cue points define entry points that allow starting decoding. Each entry point of the FAT is connected to a designated seeking position and therefore the decoder can start decoding at each table entry. The seeking accuracy is limited to the number of FAT entries or cue points.

INVENTION

In case the audio format is a layered format comprising e.g. a basic-quality layer and an improved-quality layer that has different access points than the basic-quality layer, the above-described seeking processings can not be carried out.

A problem to be solved by the invention is to provide for a layered audio bit stream—in which the layers have different seeking access points—a seeking processing that offers a good compromise between seeking accuracy, audio reproduction quality, playback latency and required processing power load. This problem is solved by the methods disclosed in claims 1 and 3. An apparatus that utilises this method is disclosed in claims 2 and 4.

Three different ways of processing are described in the following, wherein in particular the second kind of seek processing offers for layered audio formats an optimum compromise between seeking accuracy, audio reproduction quality, playback latency and required processing power load.

In principle, the inventive method is suited for searching or seeking in a layered hierarchical audio or video bit stream followed by replay, said layered bit stream including a base layer which can be decoded separately starting from base layer entry points, and including at least one enhancement layer which can not be replayed without re-synchronised data from said base layer and which has fewer entry points than said base layer, said method including the steps:

from an enhancement layer entry point located directly prior to a desired base layer entry point, starting a partial decoding of the related enhancement layer data, followed by re-synchronisation of the related enhancement layer data and, partially in parallel, starting a muted base layer decoding;

upon said re-synchronisation being carried out, starting from the following base layer entry point, which needs not be an enhancement layer entry point, decoding of the enhancement layer data and decoding of the base layer data, and combining the decoded base layer data and the decoded enhancement layer data so as to output a full-quality audio or video signal.

In principle the inventive apparatus is suited for searching or seeking in a layered hierarchical audio or video bit stream followed by replay, said layered bit stream including a base layer which can be decoded separately starting from base layer entry points, and including at least one enhancement layer which can not be replayed without re-synchronised data from said base layer and which has fewer entry points than said base layer, said apparatus including means being adapted for:

from an enhancement layer entry point located directly prior to a desired base layer entry point, starting a partial decoding of the related enhancement layer data, followed by re-synchronisation of the related enhancement layer data and, partially in parallel, starting a muted base layer decoding;

upon said re-synchronisation being carried out, starting from the following base layer entry point, which needs not be an enhancement layer entry point, decoding of the enhancement layer data and decoding of the base layer data, and combining the decoded base layer data and the decoded enhancement layer data so as to output a full-quality audio or video signal.

DRAWINGS

Figure 2:
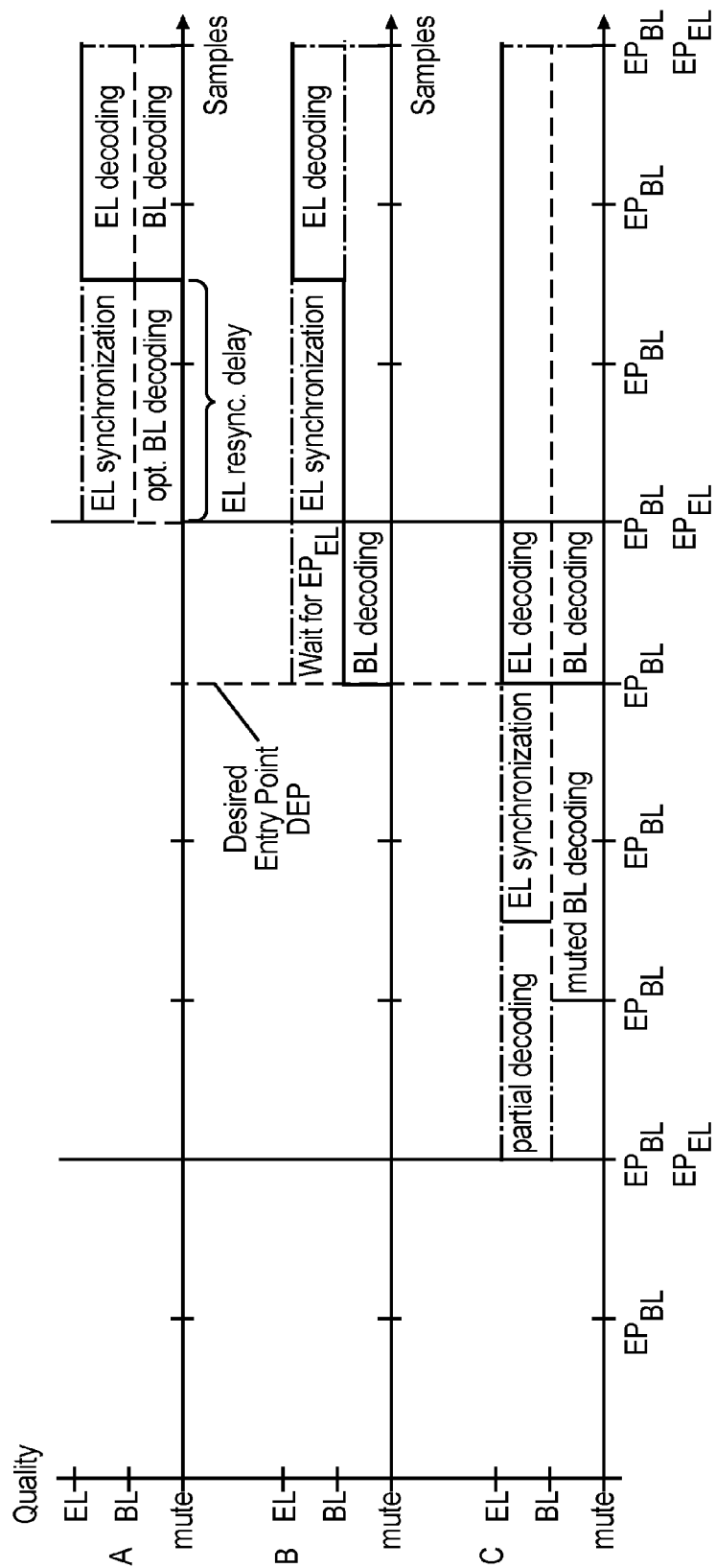
Figure 3:
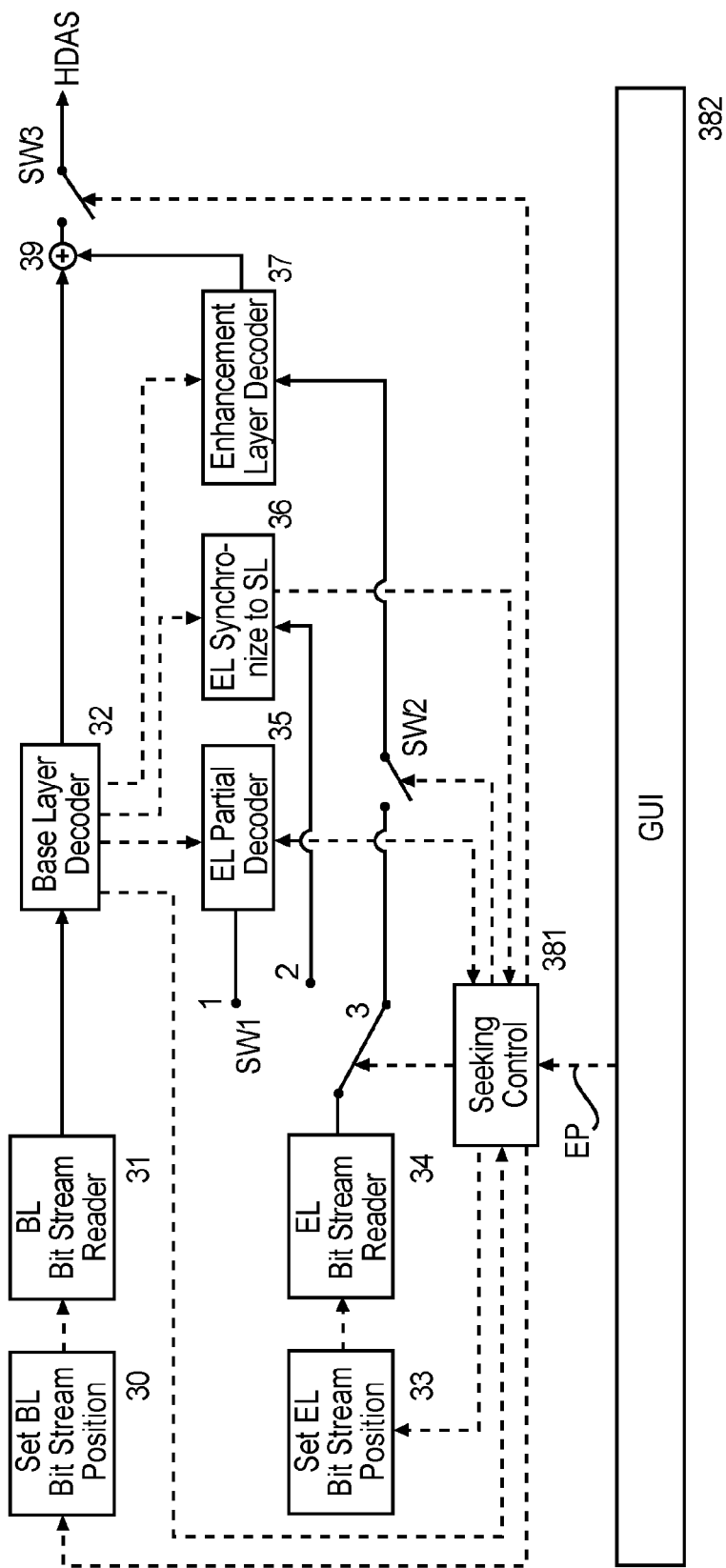

Exemplary embodiments of the invention are described with reference to the accompanying drawings, which show in:

FIG. 1 simplified format of base layer and enhancement layer of an mp3HD bit stream;

FIG. 2 three seeking methods in an mp3HD bit stream;

FIG. 3 block diagram of an audio decoder according to the invention.

EXEMPLARY EMBODIMENTS

A layered audio format comprises two or more audio qualities within one bit stream. A two-layer hierarchical bit stream (as it is used in the mp3HD file format) is depicted in FIG. 1. The upper part of FIG. 1 shows the frame-based structure of the base layer bit stream. The base layer BL contains successive sections of $K_x$ Bytes length that each start with a sync header SH including additional frame size information followed by $N_x$ encoded samples, x=0, 1, 2, 3, ..., L. This base layer BL can be decoded independently from the higher layers and the decoding of the encoded samples can start following every sync header SH. Each frame represents a fixed number of encoded samples. The sync header and the additional frame size information allow to jump from frame to frame in order to seek to a specific sample position in the audio track. It is important to note that for this frame-wise seeking operation it is not required to decode the intermediate PCM data, because the seeking operation is performed only based on the encoded bit stream data.

The bottom part of FIG. 1 depicts the extension layer bit stream. While the extension-layer bit stream is organised in frames of samples, similar to the base layer, an important difference is that the frame structure is not reflected on bit stream level. In other words, while still a certain fixed number of K samples are represented by a certain portion, i.e. L bytes, of the bit stream, there is no means to find in the raw bit stream the boundaries between adjacent frames by "just" analysing the stream of bits. To facilitate seek operations with such highly compressed extension-layer data, the header of the extension layer bit stream comprises a table, FAT, of seek target positions. This table contains a limited number of seek target positions with pointers into the corresponding positions $EP_0$, $EP_1$, $EP_2$, ... within the highly-compressed extension-layer bit stream. Each entry point $EP_x$ is headed by $M_x$ encoded enhancement samples having a length of $L_x$. There are fewer entry points $EP_x$ within the enhancement layer than sync headers within the base layer data. The drawback of this table-based approach is that the precision of seeking in the extension layer bit stream is limited to the precision of those entry points, and that the enhancement layer requires for decoding the prior (at least partial) decoding of one or more base layer frames and then enhances/enhance the overall audio quality.

The number of base layer frames or encoded samples that are required to start decoding and to generate the full audio quality are called re-synchronisation delay of the enhancement layer.

From the above it follows that for the seeking methods according to the invention the seeking accuracy of the base layer has to be higher than the seeking accuracy of the enhancement layer. As long as the seeking accuracy of the base layer is higher than the seeking accuracy of the enhancement layer this seeking processing can be applied.

Seeking Processing 1

This kind of processing is depicted in FIG. 2A. Three quality levels are given on the vertical axis: muting (i.e. no decoded audio signal present), base layer quality decoded audio signal available, and enhancement layer quality decoded audio signal available. The horizontal axis shows entry points $EP_{BL}$ for the base layer and entry points $EP_{EL}$ for the enhancement layer. Given a desired entry point DEP that preferably is located at an $EP_{BL}$ position, the processing pauses (i.e. audio quality level 'mute') until the following $EP_{EL}$ position is reached. The processing uses the low seeking accuracy of the enhancement layer for providing low latencies (i.e. re-synchronisation delay of the enhancement layer) and for avoiding peaks in the related processing load. It further offers a compromise between latency and reproduction audio quality.

The seeking is performed by using only the seeking accuracy of the enhancement layer. In this example the enhancement layer uses a FAT with a limited number of entry points. Thus, at the beginning of the seeking processing following the muting, both layers start decoding from an entry point of the enhancement layer FAT. Therefore, the base layer has to enable seeking from the position that is stored in the FAT of the enhancement layer. However, the base layer can achieve this position by parsing the frames, by using a base layer FAT or by a combination of a base layer FAT and parsing from the bit stream position stored in the FAT to the desired position. For high quality decoding (decoding of all layers) the frames or samples that are required to synchronise the base layer with the enhancement layer have to be muted. This results in a processing load peak or in latencies because the processing of the re-synchronisation has to be performed in a very short time. To overcome this issue the decoder can return the decoded samples of the base layer during the re-synchronisation of the enhancement layer. Thus, there is no latency for the playback and the playback time can be used for the re-synchronisation of the enhancement layer which reduces the peak processing load. A drawback of this kind of seeking processing is that the decoding starts with the lower audio quality of the base layer.

Seeking Processing 2

This method uses the seeking accuracy of the base layer with the advantage of avoiding the above muting period and the drawback of decoding and reproducing some samples in base layer quality. It has a high seeking accuracy and starts the audio playback directly at the desired position DEP, possibly including a small audio decoding processing delay. If it is not required to decode all samples in full quality from the beginning, this seeking processing offers the high seeking accuracy of the base layer and no latencies in the audio playback.

The base layer only is used for the seeking. The audio decoder sets the base layer to the desired position within the bit stream and starts the decoding and the playback of the base layer samples.

This seeking processing utilises the table of seeking target positions in another manner in order to obtain an excellent seeking precision that is similar to the precision that can be obtained by seeking in the baser layer bit stream. The mechanism and the obtained quality of the decoded signal are illustrated in FIG. 2B. First, the decoder sets only the base layer to the desired position within the bit stream and starts the decoding and the playback of the base layer samples. As mentioned above, the decoding quality right after the seeking operation is limited to the decoding quality of the base layer and the enhancement layer has to be set into a re-synchronisation state. This means that the enhancement layer tracks the position of the base layer and starts the synchronisation at the next entry point in the enhancement layer bit stream. From this entry point the re-synchronisation of the enhancement layer starts. Because the re-synchronisation is processed during the playback of the base layer samples, peaks in the processing load are prevented. When the enhancement layer is synchronised to the base layer the audio quality is automatically switched to the full audio quality of the enhancement layer. In the sequel, decoding of the bit stream continues in full quality, using information from both the base layer and the extension layer. In contrast to the first seeking processing, the second seeking processing allows to seek to any position within the audio track with a very high precision, albeit decoding from this position to the next seek target position in the FAT table will deliver only base-layer-quality audio samples. A significant advantage of this seeking method is that this trade-off can be obtained while the computational performance is kept at the continuous level, without any performance peak (because the replay period of the BL can be used for synchronising the EL data).

Seeking Processing 3

This processing offers high-accuracy seeking in full audio quality with the drawback of latencies or processing load peaks (caused by real-time conditions: within a short time period a lot of data are to be decoded during the seeking period). On one hand, for a high definition audio playback system it may not be desirable to start the playback with lower base layer quality. On the other hand, the high seeking precision of the base layer is still desired. However, in such case playback latencies or high processing loads caused by the seeking processing can not be prevented but can be minimised.

The first point to be taken into account when seeking with high quality and high precision is the re-synchronisation delay of the enhancement layer. If the resynchronisation delay is constant or can be predicted by a worst case estimation, it can be subtracted from the desired seeking position. Then, the high quality decoding can start at the desired position although the seeking is performed to the position that is required to synchronise the enhancement layer. The enhancement layer has to start the synchronisation at the seeking position of the base layer, which is achieved by using the nearest entry point in the enhancement layer bit stream prior to the re-synchronisation position. From that enhancement layer entry point the enhancement layer decoder parses the enhancement layer bit stream to the desired position. For some bit stream formats the parsing is feasible without requiring information from the base layer. For example in the mp3HD format, the enhancement layer can perform the entropy decoding of the enhancement layer to parse the frames. In other formats the base layer is required for parsing the enhancement layer bit stream. Then the base layer has to seek to the entry point of the enhancement layer and both layers have to parse their bit streams to the re-synchronisation point. During the parsing of the bit streams the audio output is zero or turned off. Therefore, all functions of the decoding processing which are not required for parsing the bit stream can be turned off as well. For example, such functions are a synthesis filter bank or a re-quantisation of the samples. When both layers have reached the re-synchronisation position, the samples between the desired position and the current position are used for the re-synchronisation of the base layer and the enhancement layer. The re-synchronisation is done at the desired seeking position, and the audio playback can start in full quality.

Each one of the layered audio format seeking processings offers a different compromise between seeking accuracy, latency and audio quality.

For a standard decoding, switch SW1 in FIG. 3 is in position 3 and switches SW2 and SW3 are closed. Base layer bit stream reader 31 reads the base layer BL bit stream and sends the bit stream data to the base layer decoder step or stage 32 which outputs the decoded base layer audio signal. Enhancement layer bit stream reader 34 reads the enhancement layer EL data from the EL bit stream. The enhancement layer decoder step or stage 37 decodes these data and outputs the decoded enhancement layer audio signal. Combiner 39 combines the decoded BL and EL signals and switch SW3 outputs the high definition audio signal HDAS.

When operating in seeking processing 1 mode, the audio decoder basically is operating as described before. The mouse or key-controlled or graphical user interface GUI 382 sends the desired entry point EP to the seeking control step or stage 381 which stops the current normal playback, opens switch SW3, sets switch SW1 to position 2, computes the EP of the EL in bytes, determines the related BL bit stream EP in bytes and feds the BL bit stream position to a BL bit stream position set step or stage 30 and feds the EL bit stream position to an EL bit stream position set step or stage 33.

Step/stage 30 sets the bit stream pointer of step/stage 31 to the new BL position and step/stage 33 sets the bit stream pointer of step/stage 34 to the new EL position.

Base layer bit stream reader 31 reads the base layer BL bit stream at the corresponding position and base layer decoder step or stage 32 outputs the decoded base layer audio signal. For a playback of the BL during the EL re-synchronisation, switch SW3 is closed by seeking control step or stage 381.

Enhancement layer bit stream reader 34 reads the enhancement layer EL bit stream at the corresponding position and sends a corresponding signal via SW1 to the enhancement layer synchronisation step or stage 36, which synchronises the EL with the BL by using a related information from the base layer decoder step or stage 32. Step/stage 36 signalises the end of the EL re-synchronisation to the seeking control step or stage 381.

For starting the full quality playback, step/stage 381 sets switch SW1 to position 3 and closes switch SW2. Enhancement layer decoder step/stage 37 decodes the EL signal from step/stage 34 while using related information from the base layer decoder step or stage 32, and SW3 is closed.

When operating in seeking processing 2 mode, the mouse or key-controlled or graphical user interface GUI 382 sends the desired entry point EP to the seeking control step or stage 381, which stops the current normal playback, opens switch SW3, stops the enhancement layer decoder step/stage 37 by opening switch SW2, computes the EP in bytes of the BL bit stream, closes switch SW3, and sends the BL bit stream position to BL bit stream position set step/stage 30 that sets the bit stream pointer of BL bit stream reader 31 to the new BL position. Reader 31 reads correspondingly the BL bit stream and BL decoder 32 decodes the base layer signal. For waiting for next EL EP, BL decoder 32 sends the current position in samples to the seeking control step/stage 381, which checks whether the next EL EP has been reached by comparing the current position in samples with the EL EPs to find the next EL EP.

For starting the EL re-synchronisation when the next EL EP has been reached, seeking control step/stage 381 sets switch SW1 to position 2 and sends the new EL bit stream position to EL bit stream position set step/stage 33 which sets the bit stream pointer of EL bit stream reader 34 to the new EL position. Reader 34 reads the EL bit stream and sends its output signal to the EL synchronisation step/stage 36, which synchronises the EL with the BL by using corresponding information from the BL decoder 32 and which confirms to seeking control step/stage 381 that re-synchronisation has been carried out.

For starting full quality playback, seeking control step/stage 381 sets switch SW1 to position 3 and closes switch SW2. EL decoder step/stage 37 decodes the EL signal by using corresponding information from the BL decoder 32. The output signals of BL decoder 32 and EL decoder 37 are combined in combiner 39, which outputs via switch SW3 the full quality decoded audio signal HDAS.

When operating in seeking processing 3 mode, the mouse or key-controlled or graphical user interface GUI 382 sends the desired entry point EP to the seeking control step or stage 381, which stops the current normal playback, opens switches SW2 and SW3, computes the EP in bytes of the BL bit stream and computes the EP in bytes of the EL bit stream that is directly prior to the entry point provided by GUI 382. For starting the partial decoding, seeking control step/stage 381 sends the computed EL bit stream position to EL bit stream position set step/stage 33, which sets the bit stream pointer of EL bit stream reader 34 to the new EL position. Further, step/stage 381 sends the number of partially decoded samples to an EL partial decoder 35 and sets switch SW1 to position 1. EL partial decoder 35 partially decodes a number of given samples by optionally using information from BL decoder 32, and signalises the end of the partial decoding to seeking control step/stage 381. For starting the BL decoding without playback, step/stage 381 sets switch SW1 to position 2 and sends the BL bit stream position to BL bit stream position set step/stage 30, which sets the bit stream pointer of BL bit stream reader 31 to the new BL position. Reader 31 reads correspondingly the BL bit stream and BL decoder 32 decodes the base layer signal.

For starting the EL re-synchronisation, EL bit stream reader 34 reads the EL bit stream and sends its output signal to the EL synchronisation step/stage 36 that synchronises the EL with the BL using corresponding information from the BL decoder 32 and that confirms to seeking control step/stage 381 that re-synchronisation has been carried out.

For starting full quality playback, seeking control step/stage 381 sets switch SW1 to position 3 and closes switches SW2 and SW3. EL decoder step/stage 37 decodes the EL signal by using corresponding information from the BL decoder 32. The output signals of BL decoder 32 and EL decoder 37 are combined in combiner 39, which outputs via switch SW3 the full quality decoded audio signal HDAS.

The invention claimed is:

1. A method for searching in a layered hierarchical audio or video bit stream followed by replay, said layered bit stream including a base layer which can be decoded separately starting from base layer entry points, and including at least one enhancement layer which cannot be replayed without re-synchronized data from said base layer, said method comprising: from an enhancement layer entry point located directly prior to a desired base layer entry point, starting, by an enhancement layer partial decoder, a partial decoding of the related enhancement layer data, followed by re-synchronization of the related enhancement layer data, by an enhancement layer resynchronization stage, and, partially in parallel, starting a muted base layer decoding by a base layer decoder; and combining, upon said re-synchronization being carried out, from the following base layer entry point, which needs not be an enhancement layer entry point, by a combiner, the decoded base layer data and the decoded enhancement layer data; and outputting a transformed full-quality audio or video signal.

2. An apparatus for searching in a layered hierarchical audio or video hit stream followed by replay, said layered bit stream including a base layer which can be decoded separately starting from base layer entry points, and including at least one enhancement layer which cannot be replayed without re-synchronized data from said base layer, said apparatus comprising an enhancement layer partial decoder that from an enhancement layer entry point located directly prior to a desired base layer entry point, starts a partial decoding of the related enhancement layer data; an enhancement layer re-synchronization stage that re-synchronizes the related enhancement layer data; a base layer decoder that, partially in parallel, starts a muted base layer decoding; and a combiner that, upon said re-synchronization being carried out, starting from the following base layer entry point, which needs not be an enhancement layer entry point, combines the decoded base layer data and the decoded enhancement layer data, and outputs a transformed full-quality audio or video signal.

* * * * *